United States Patent [19]
Craft

[11] Patent Number: 5,435,359
[45] Date of Patent: Jul. 25, 1995

[54] STUMP GRINDER WITH TRANSVERSELY MOUNTED CUTTER WHEEL

[76] Inventor: Robert J. Craft, 320 N. Jefferson, Apt. 9, Brownsburg, Ind. 46112

[21] Appl. No.: 269,918

[22] Filed: Jun. 30, 1994

[51] Int. Cl.⁶ .......................................... A01G 23/06
[52] U.S. Cl. ........................ 144/334; 144/2 N; 144/218; 144/241; 37/302
[58] Field of Search ............... 37/302; 144/2 N, 34 R, 144/218, 231, 236, 241, 334

[56]  References Cited
U.S. PATENT DOCUMENTS

| | | |
|---|---|---|
| Re. 28,651 | 12/1975 | Welborn . |
| 2,601,366 | 6/1952 | Chapman . |
| 2,671,478 | 3/1954 | Anderson et al. ............... 144/2 N |
| 2,746,492 | 5/1956 | De Hardit . |
| 2,825,370 | 3/1958 | Fieber ............................ 144/2 N |
| 2,887,134 | 5/1959 | Bartlett . |
| 2,912,022 | 11/1959 | Ver Ploeg et al. . |
| 2,927,613 | 3/1960 | Franzen et al. . |
| 3,198,224 | 8/1965 | Hiley . |
| 3,389,726 | 6/1968 | Good . |
| 3,732,905 | 5/1973 | Pickel . |
| 3,818,957 | 6/1974 | Schoonover . |
| 3,838,980 | 3/1975 | Blüm . |
| 3,911,979 | 10/1975 | Rousseau . |
| 4,041,996 | 8/1977 | Grover . |
| 4,271,879 | 6/1981 | Shivers et al. . |
| 4,530,385 | 7/1985 | York . |
| 4,621,668 | 11/1986 | York . |
| 4,681,145 | 7/1987 | York . |
| 4,709,736 | 12/1987 | Bellars . |
| 4,827,995 | 5/1989 | Wilson . |
| 4,843,769 | 7/1989 | Dreiling . |
| 4,848,423 | 7/1989 | Yoder . |
| 4,974,649 | 12/1990 | Manning . |
| 5,158,126 | 10/1992 | Lang . |
| 5,355,918 | 10/1994 | Lang ............................... 144/2 N |

OTHER PUBLICATIONS

Levco Stump Grinders Brochure (4 pages), c. 1994.
Levco Stump & Root Grinders Brochure (6 pages), c. 1994.
Arps Stump Master Hydraulically Operated Stump Cutter brochure (4 pages) c. 1960s.
Arps Stump Master Models J00 and J01 Manual (cover page), c. 1960s.
Stumpster Model 1001-3 brochure (3 pages), c. 1970.
Stumpster Model 3000 Series brochure (2 pages), c. 1994.
Rayco Stump Cutter data sheet (2 pages), c. 1990.
Arps Stump Master Models J00 and J01 Tractor Installation Manual, cover and pp. 1-10, 1969.
Arps Stump Master Models J00 and J01 Operation and Parts Manual, pp. 1-14, c. 1960s.
Vermeer Stump Cutters brochure (6 pages), 1991.
Border City Tool "Smart Pocket" literature (2 pages), c. 1992.
Baranyi, Sandor J., "Controlling Relative Motion of Cardan Joints," *Machine Design* pp. 82, 86, 88, Mar. 7, 1991.

*Primary Examiner*—W. Donald Bray
*Attorney, Agent, or Firm*—Woodard, Emhardt, Naughton, Moriarty & McNett

[57]  ABSTRACT

A stump grinder having a support frame, an elongated main beam horizontally pivotally mounted on the frame, and a cutter wheel supported by and transversely oriented with respect to the main beam and rotatable about a substantially horizontal axis, the cutter wheel having a plurality of peripherally mounted stump cutter teeth spaced apart circumferentially and axially in a predetermined transversely oriented cutting pattern. The stump grinder is attachable to a three-point hitch of a tractor and the cutter wheel is directly driven by the tractor power take-off. Multiple stabilizers are mounted on the frame to provide stability as well as cutting depth control. Compensation utilizing multiple universal joints is provided to minimize angular velocity differences between the tractor power take-off and the cutter wheel. Depth gauging is provided on the periphery of the cutter wheel to control the depth of cut of individual teeth. The stump grinder also has a telescopic extension utilizing zero-lash, wear-compensated slider blocks.

36 Claims, 7 Drawing Sheets

STUMP GRINDER WITH TRANSVERSELY MOUNTED CUTTER WHEEL

BACKGROUND OF THE INVENTION

This invention relates generally to devices for removing tree stumps, and, more particularly, to stump grinders having a cutter wheel with peripherally mounted cutter teeth.

A number of different techniques are known for removal of tree stumps, including the use of explosives, mechanical force such as by a bulldozer, and also by comminuting or grinding the stump down to ground level and preferably below. Stump grinding has advantages over other techniques for stump removal, such as greater safety than the use of dynamite, less damage to lawns or ground surfaces surrounding the stump than with the use of bulldozers or other heavy equipment.

Numerous types of equipment for grinding stumps have been devised over the years. For example, it is known to mount stump cutter teeth on one or both faces of a cutter disc or wheel which is mounted transversely, i.e., across the longitudinal axis of a machine support frame or swing arm, with the machine moving the cutter wheel forward or backward along that axis against a portion of a stump, whereby the teeth on one face contact and grind that portion. Examples of this type of equipment are described in the following patents:

| Patent No. | Inventor | Issue Date |
| --- | --- | --- |
| 2,887,134 | Bartlett | May 19, 1959 |
| 3,911,979 | Rousseau | Oct. 14, 1975 |
| 4,681,145 | York | Jul. 21, 1987 |

With stumps that are wider than the cutter wheel, multiple passes through the stump are required, and on each pass this type of machine typically produces a semicircular trough matching the wheel shape. A common pattern involves grinding down to ground level on one side of a stump, repeating the process on the other side, and then grinding the remaining central portion of the stump. The remaining portion is V-shaped as viewed from above, and it thereby causes an uneven load on the engine driving the cutter wheel as the wheel is pulled or pushed through the V-shaped section. This type of machine often experiences high levels of lateral and vertical vibration due to the bucking reaction of the cutter wheel on the uneven stump profile. The result of such uneven loading and high vibration can be particularly harsh on the transmission of a tractor with a power take-off (PTO), from which many stump grinders are driven.

It is also known to mount stump cutter teeth on one or both faces of a cutter wheel which is swung from side to side during a cutting operation with the teeth on one face or the other contacting and grinding a stump from the side. Examples of this type of equipment are described in the following patents:

| Patent No. | Inventor | Issue Date |
| --- | --- | --- |
| RE 28,651 | Welborn | Dec. 16, 1975 |
| 3,732,905 | Pickel | May 15, 1978 |
| 4,271,879 | Shivers et al. | Jun. 9, 1981 |
| 4,709,736 | Bellars | Dec. 1, 1987 |
| 4,848,423 | Yoder | Jul. 18, 1989 |

This type of machine ordinarily requires its own engine for power, which adds to the expense of the machine, or, particularly, in the case of PTO-driven machines, a 90° gearbox or a hydraulic drive, either of which is a costly item in relation to the other parts of a machine. Hydraulic drives are also less efficient than direct drives.

Stump grinders are also available with cutter teeth mounted on the periphery of a drum or wheel mounted so as to rotate vertically in a longitudinal direction, with the drum being moved vertically and/or longitudinally during a cutting operation, and in some cases with the lateral position of the drum being adjustable via a pivot mechanism. One such stump grinder, disclosed in U.S. Pat. No. 4,041,996 to Grover, is adapted for attachment to an excavator and is driven by a rotary hydraulic and/or electric motor coaxially mounted with a cutter drum. Alternatively, power to a drum with such a mounting configuration is known to be supplied via a 90° gearbox, a relatively expensive item as pointed out above.

In spite of decades of activity in this area there remains a need for a relatively low-cost, reliable, easily operated, stable stump grinder capable of providing smooth yet relatively rapid cutting action.

SUMMARY OF THE INVENTION

The present invention according to one aspect thereof is a stump grinder including a support frame, an elongated main beam horizontally pivotally mounted on the frame, and a cutter wheel supported by and transversely oriented with respect to the main beam, the cutter wheel having a plurality of peripherally mounted stump cutter teeth. According to this aspect of the invention multiple stabilizers are mounted on the frame and the main beam is movable with respect to the stabilizers.

According to another aspect of the invention, the transversely mounted cutter wheel has a plurality of peripherally mounted stump cutter teeth and noncutting front and rear faces.

According to a further aspect of the invention, a stump grinder is provided which includes an elongated main beam horizontally pivotally mounted on a support frame, and a cutter wheel supported by and transversely oriented with respect to the main beam and rotatable about a substantially horizontal axis, the cutter wheel having a plurality of peripherally mounted stump cutter teeth spaced apart circumferentially and axially in a predetermined transversely oriented cutting pattern.

The invention further provides a novel method of grinding a stump which includes providing a cutter wheel with a plurality of peripherally mounted stump cutter teeth, supporting the cutter wheel with an elongated main beam-pivotally mounted for movement in a horizontal plane, with the cutter wheel transversely oriented with respect to the main beam and the main beam and cutter wheel together defining a transversely oriented cutting path, positioning the main beam in operative proximity to a stump with the cutter wheel adjacent to one side of said stump and with the stump lying in the transversely oriented cutting path, and moving the main beam and cutter wheel transversely to grind a portion of the stump.

Various objects and advantages of the present invention will become apparent upon reading the following detailed description of the preferred embodiment in conjunction with the accompanying drawings.

DESCRIPTION OF THE PREFERRED EMBODIMENT

Figure 1:
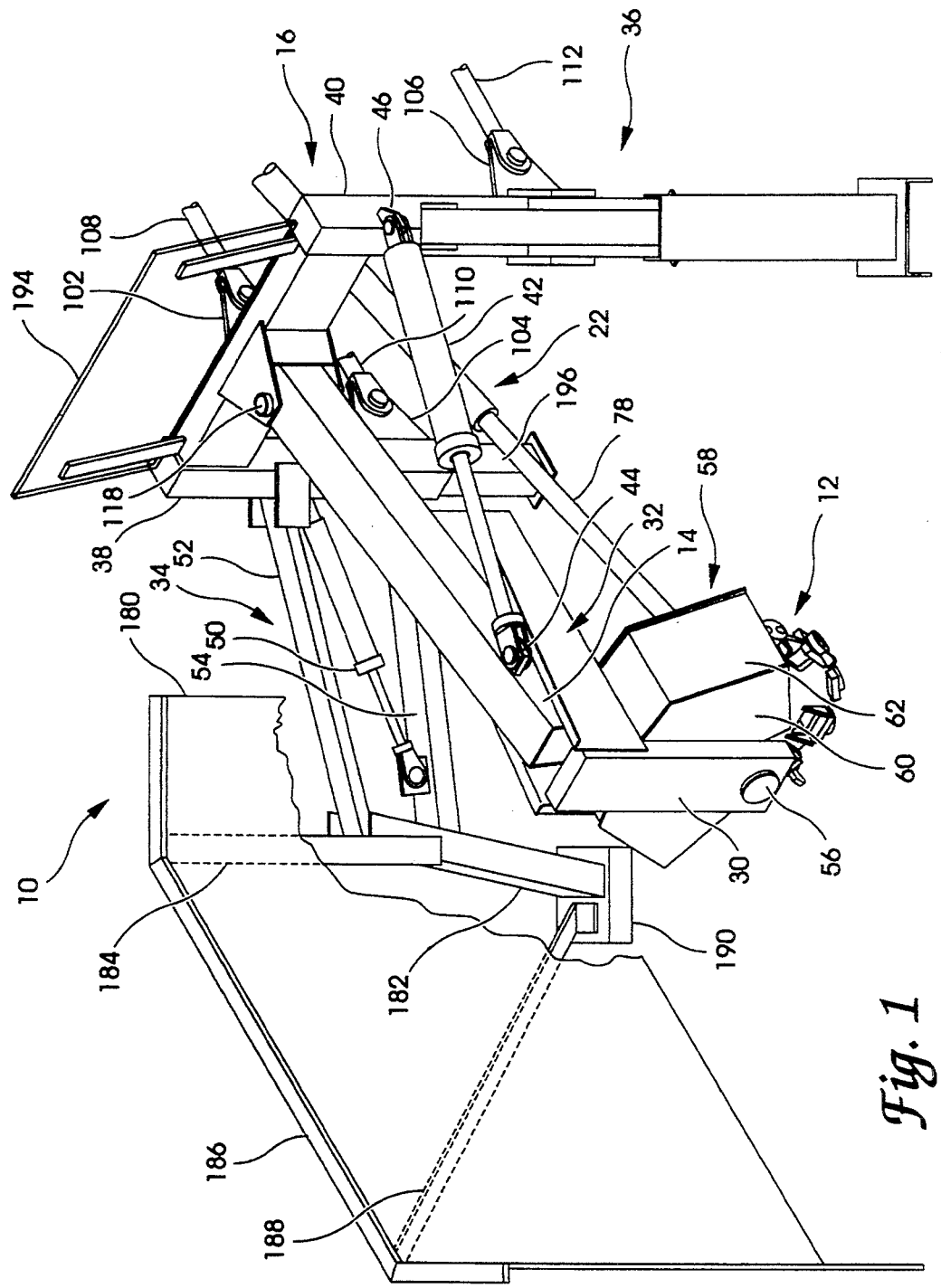
FIG. 1 is an upper right rear perspective view of the preferred embodiment of the stump grinder according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates. The word "wheel" as used herein is intended to encompass drums, discs, disc-like hubs, generally circular plates and the like.

Figure 2:
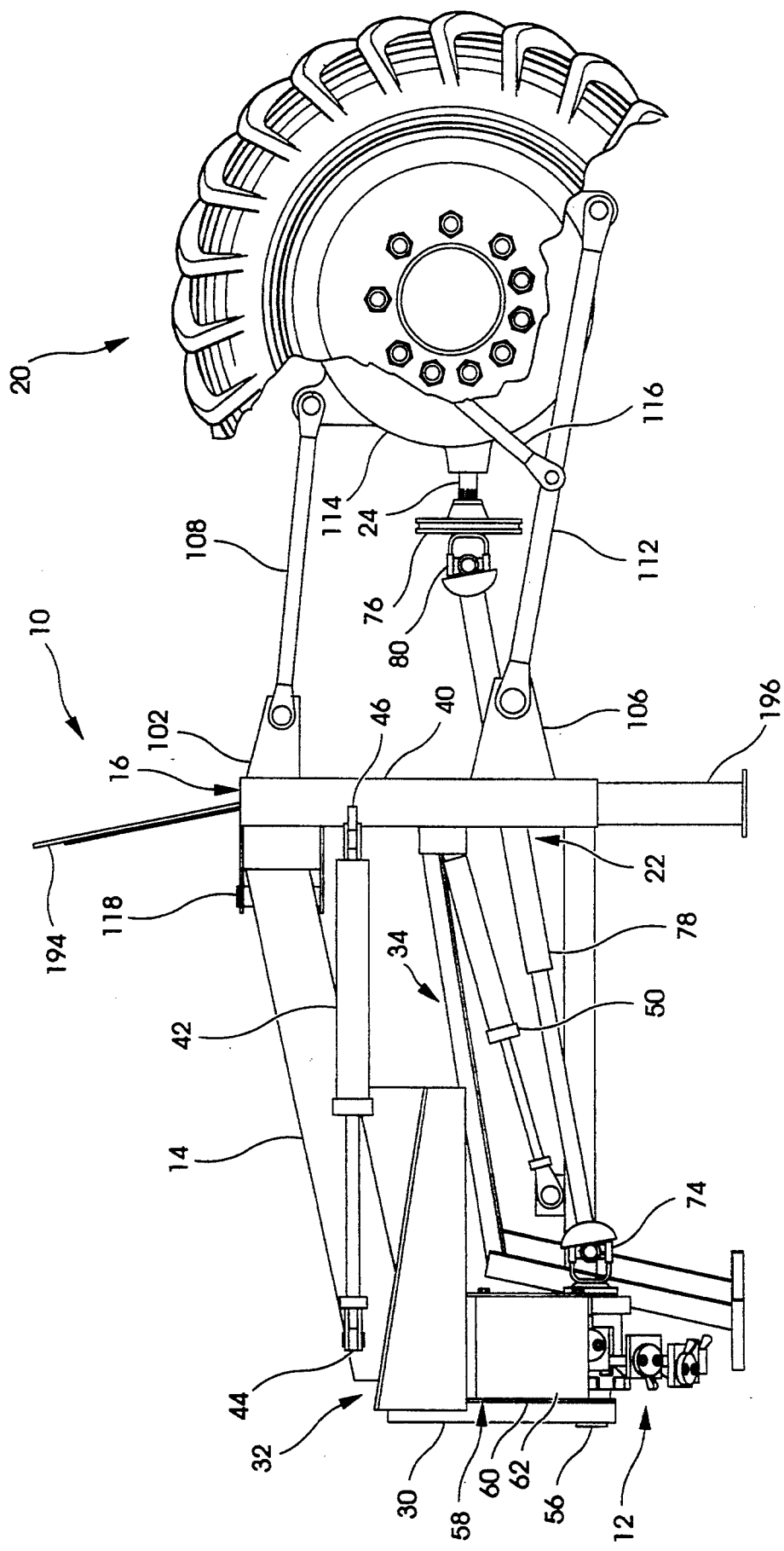
FIG. 2 is a right side view of the stump grinder of FIG. 1 shown attached to a tractor with a three-point hitch and power take-off, with portions removed for illustration purposes.

With reference to FIGS. 1 and 2, the presently preferred embodiment of a stump grinder 10 according to the present invention has a cutter wheel 12 supported by and transversely oriented with respect to an elongated main beam 14 which is pivotally mounted on a support frame 16 which is designed to be vertically oriented in use to allow movement of the main beam and cutter wheel in a horizontal plane for transverse cutting of a stump. The frame includes hitch attachment points for supporting the stump grinder on a three-point hitch of a tractor 20 so equipped, and a drive line 22 is provided to interconnect the cutter wheel and the power take-off 24 of the tractor. As will be described in more detail with reference to FIGS. 3 and 4, the cutter wheel is attached to a hub 26 which is rotatably mounted on a spindle 28 which in turn is mounted horizontally in a vertical support member 30 on the end of a telescopic extension 32 slidably mounted on the main beam. Thus, it can be appreciated that the cutter wheel rotates in a vertical plane which is transverse to the longitudinal axis of the main beam, with the telescopic extension adapted as will be described to move longitudinally in a horizontal plane. If desired, the main beam may be oriented such that it is exactly perpendicular to the transverse plane of the cutter wheel, although in the preferred embodiment the main beam slopes downwardly from the support frame to the telescopic extension as illustrated in the drawings.

The stump grinder includes retractable left and right side stabilizers 34 and 36 pivotally mounted on left and right vertical frame members 38 and 40, respectively, extending rearwardly therefrom and 45° to either side of the longitudinal axis. The stabilizers are not only used to maintain stability during a cutting operation, but also make it possible to control the cutting depth independent of the three-point hitch controls on the tractor, as will be described.

The position of the elongated main beam with respect to its nominal center position in line with the longitudinal axis of the tractor is controlled by a hydraulic cylinder 42 attached on one end to a bracket 44 on the main beam and on another end to a bracket 46 on right side vertical frame member 40, the hydraulic cylinder being connected by conventional hoses (not shown) to a hydraulic control valve which may be one of the auxiliary hydraulic valves on the tractor itself or may be a separate hydraulic valve mounted on the tractor for operation of the stump grinder. The telescopic extension is extended and retracted by an internally mounted hydraulic cylinder 48 attached on one end to the main beam and on the other end to the telescopic extension, as shown in phantom in FIG. 6. A suitable telescopic extension range for general use is provided by a cylinder with a 12" maximum stroke. Each stabilizer is likewise controlled hydraulically, by means of a hydraulic cylinder 50 pivotally attached between upper and lower links 52 and 54 of the stabilizer as illustrated in FIGS. 1 and 2. The hydraulic cylinders on the stabilizers are connected by hydraulic hoses (not shown) to a tee connection whereby both stabilizer cylinders are supplied with hydraulic fluid from the same source, the effect being that the stabilizers automatically compensate for uneven terrain and thereby tend to equalize the load on the stabilizers.

A separate hydraulic valve is particularly useful for connection of the stump grinder as just described to a tractor having only single or auxiliary hydraulic valve outlets, in which case a three-section, four-way hydraulic valve is most advantageously connected in series with one of the dual auxiliary valve outlets on the tractor, and then with separate pairs of hydraulic hoses from the three valve sections to the swing arm cylinder, the telescopic extension cylinder, and the tee connection for the stabilizer cylinders, respectively.

Figure 3:
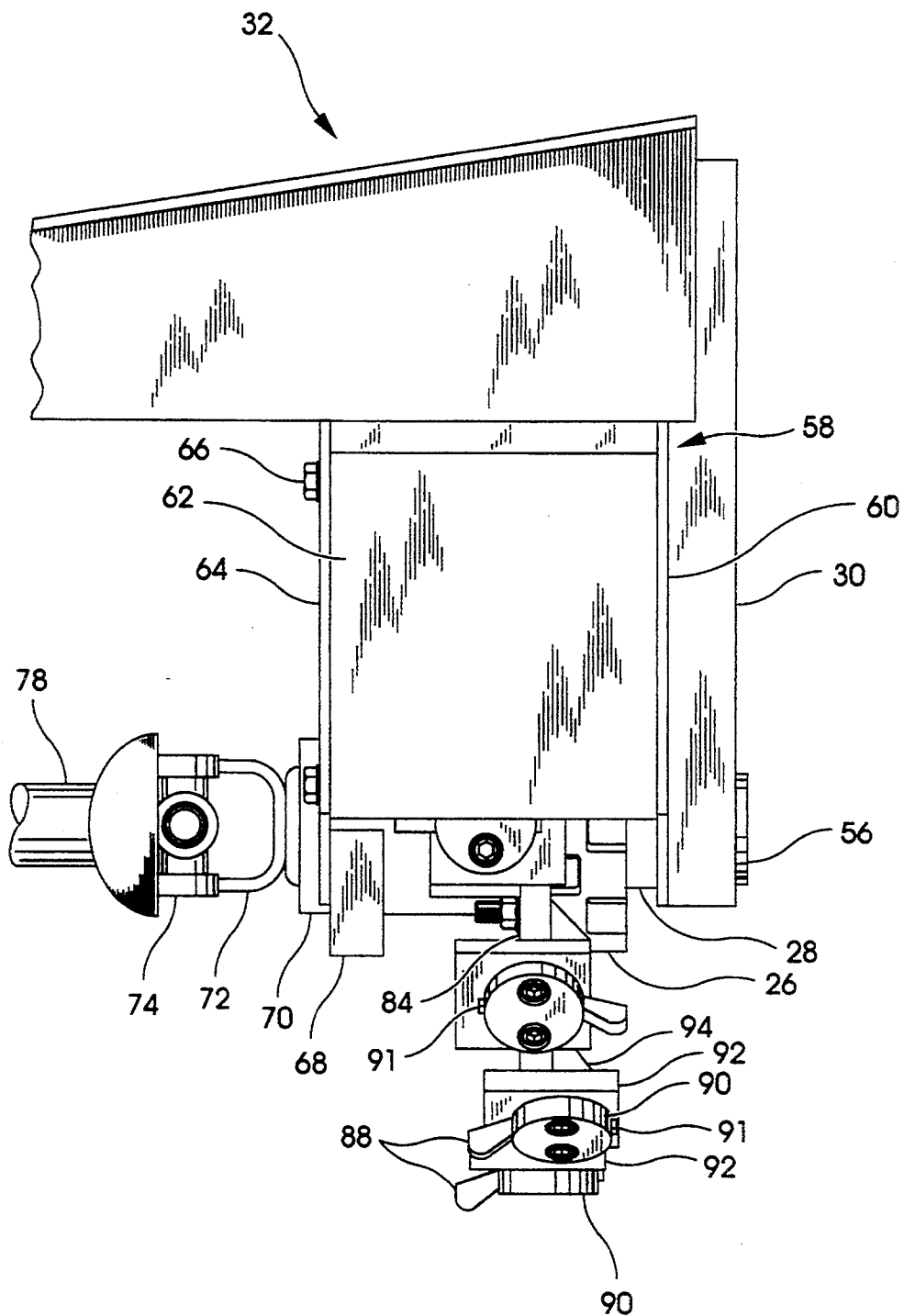
FIG. 3 is a left side view of a portion of the stump grinder of FIG. 1, showing details of the cutter wheel and wheel mounting structure.
Figure 6:
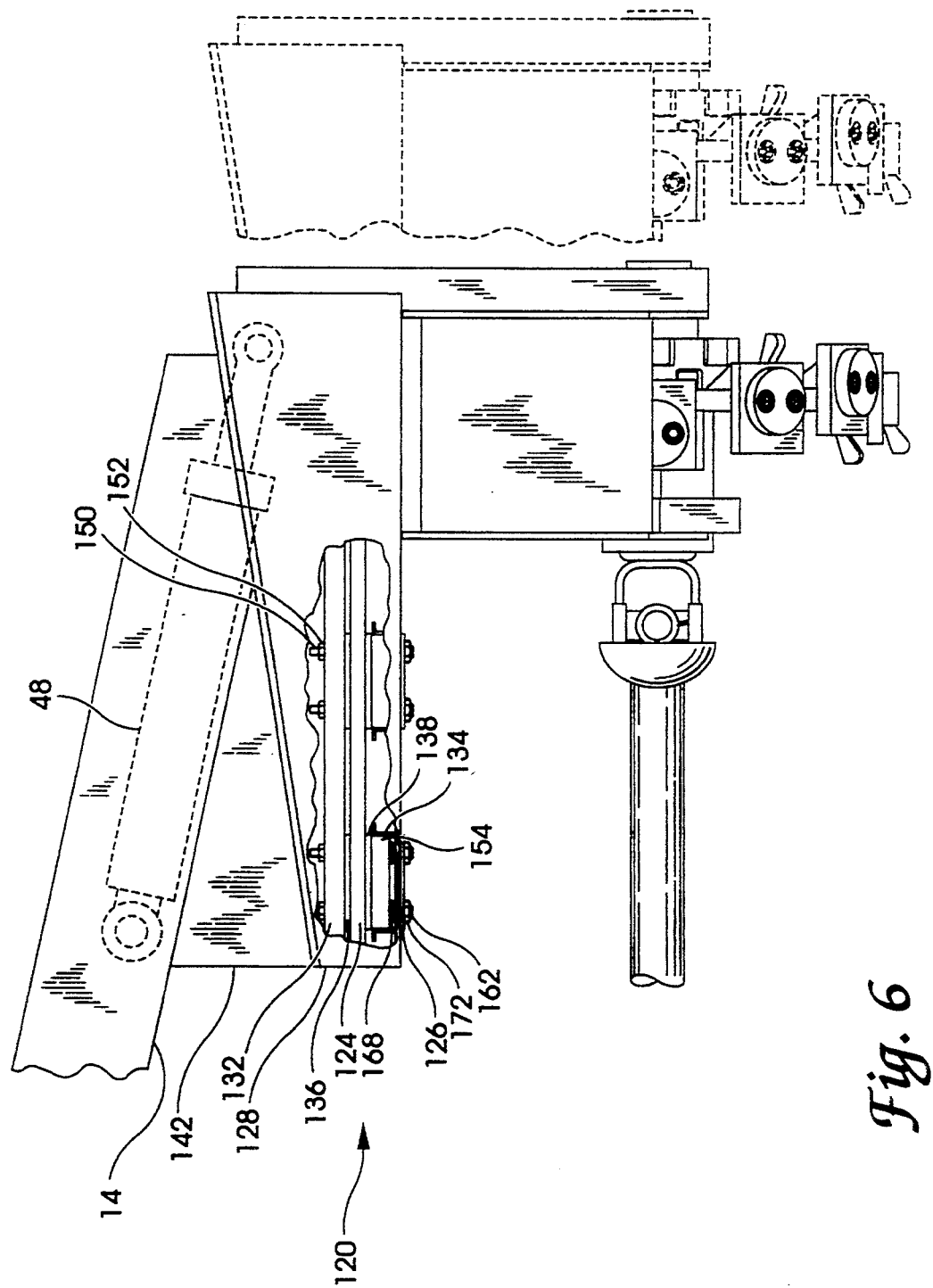
FIG. 6 is a left side view of the telescopic extension on the stump grinder of FIG. 1, with the extended state illustrated in phantom.

As shown in more detail in FIG. 3 and to some extent in FIG. 6, the cutter wheel is bolted onto the hub which is rotatably mounted on the spindle, the rear end of which is fixedly attached, preferably by welding, to the vertical support member. A hub and spindle combination with tapered roller bearings is preferred; one such commercially available combination is identified as Dexter 10K. A small section of bar stock 56 is welded onto the rear end of the spindle to extend the combination thereof rearward of the vertical support member, as shown in greatest detail in FIG. 6. The cutter wheel rotates within a housing 58 which essentially covers the upper half of the wheel. The housing includes a rear plate 60 welded to the vertical support member, a central section 62 welded to the rear plate and to the telescopic extension, and a removable front plate 64 attached by bolts 66 or the like to the central portion of the housing. The removable front plate has welded thereto a semicircular bottom piece 68 extending under the forward end of a cylindrical hub cover 70 which is welded on its rear end to the center of the cutter wheel and is welded on its forward end to the yoke 72 of the rear universal joint 74 of drive line 22 As will be appreciated by those skilled in the art, the drive line consisting of the slip clutch 76, telescopic drive shaft 78 and front and rear U joints 80 and 74 directly interconnects the PTO output of the tractor with the cutter wheel. A suitable telescopic drive shaft is commercially available from Neapco as Part No. 58-2251, and a suitable slip clutch is commercially available from Neapco as Part No. 80-3502. As an alternative to the position shown in the drawings, the slip clutch may be positioned on the rear end of the drive line.

Figure 4:
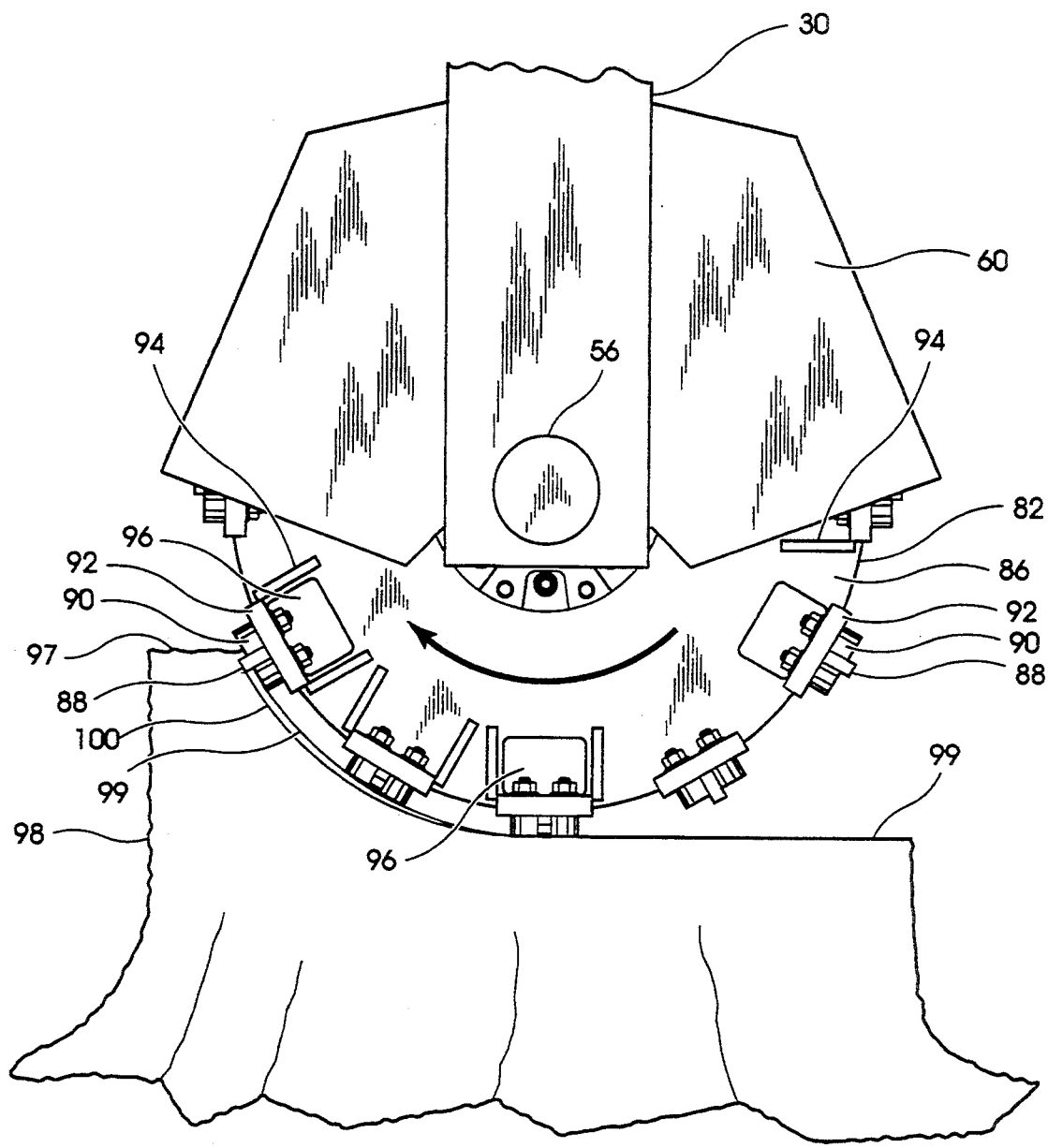
FIG. 4 is a rear view of the cutter wheel and a corresponding cross-sectional view of a stump.

As shown in detail in FIGS. 3 and 4, the cutter wheel includes a generally circular plate 82 having front and rear faces 84 and 86 and twelve cutter teeth 88 attached to the periphery thereof by respective tooth holders 90 bolted to mounting plates 92 which are welded to the periphery of the wheel along with support gussets 94.

The cutter wheel also includes a central hole of appropriate size to allow the wheel to pass over the central portion of the hub on which it is mounted, as well as unthreaded holes radially outward therefrom for passage of mounting studs on the hub through the cutter wheel, which is then secured to the hub by nuts fastened on the exposed ends of the studs. Cylindrical hub cover 70 is welded to the inside surface of the central hole such that it is coaxial with the spindle axis, and it provides at its forward end a mounting surface for the rear universal joint as alluded to earlier.

The disclosed cutter wheel with teeth mounted thereon is approximately 24 inches in diameter, and is suitable for most stumps, although the stump grinder may alternatively be designed for other wheel sizes. A smaller or greater number of teeth may be employed depending on the size of the cutter wheel and other factors, although an even number is preferred. The mounting plates are uniformly sized square plates, with axially offset through holes for mounting the tooth holders. The cutter teeth are uniformly spaced circumferentially, i.e., about the periphery of the cutter wheel, and are spaced axially in a predetermined transversely oriented cutting pattern. Toward that end, the tooth holders and associated mounting plates are axially spaced with respect to the cutter wheel plate, and cutouts 96 are provided in the plate as necessary for clearance of the mounting bolts and nuts which extend radially inwardly between the front and rear faces of the plate. The cutter teeth are axially spaced with this mounting structure so as to produce slightly overlapping parallel cutting tracks with a combined width or cutting swath of approximately 7 inches. The cutting tracks are cut in the following order, with the axially forwardmost track and cutter tooth designated as number 1 for reference purposes: 1-8-5-3-11-9-7-2-6-4-12-10.

Figure 5:
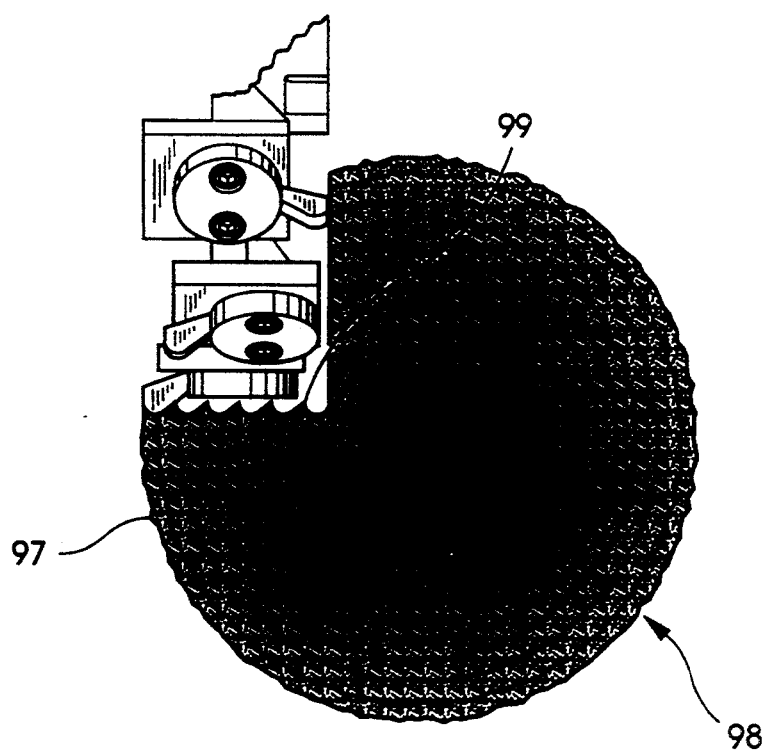
FIG. 5 is a top view of a portion of the cutter wheel.

The cutter wheel rotates clockwise as viewed from the rear, as indicated by the arrow in FIG. 4, and the cutter teeth are accordingly selected and oriented with cutting faces on their forward surfaces in the clockwise direction. The teeth are carbide tipped and include a straight shank portion extending axially between the tooth holder and mounting plate, and an angled tip portion extending axially and radially beyond the tooth holder as shown in FIGS. 3–5. The axial extension is approximately one inch, and is relatively precisely controlled by stops 91 welded in position at one end of the slot extending through each tooth holder and extending into each slot a predetermined, preferably uniform, distance. The stops enable quick and easy replacement of cutter teeth without gauging or measuring position; a tooth is simply inserted into the slot of a tooth holder until its shank contacts the stop.

The radial extension beyond the tooth holder is approximately ⅛th of an inch; this arrangement has been found to limit the depth of cut of each tooth while upcutting, i.e., cutting upwardly as the clockwise rotating cutter wheel is moved transversely from right to left into an uncut portion 97 of a stump 98 illustrated in cross-section in FIG. 4. Upcutting produces reactionary forces which tend to drive the cutter teeth down into the wood excessively such that the wheel binds and stalls. In essence, the tooth holders on the cutter wheel of the present invention function as depth gauges, riding on previously cut wood 99 as depicted in FIGS. 4 and 5 and preferably allowing each tooth to remove approximately 1/16th to ⅛th inch of wood per revolution. FIG. 4 shows the cutter wheel at the moment the rearmost cutter tooth is extending its cutting track 100 while its associated tooth holder and the subsequent tooth holders ride on the wood at a level 99 determined by cutting tracks made on the previous revolution of the wheel. The depth of cut of each tooth is less than ⅛th inch because the leading and trailing edges of the tooth holders ride along a circular path defined by the level of wood 99 and thereby keep the center of each tooth holder above the wood to some degree, as shown in FIG. 4. In order to provide the desired orientation of cutting faces with some teeth extending axially forward of the wheel and others extending axially rearward, the preferred embodiment employs a combination of left-hand and right-hand cutter teeth which are commercially available along with associated tooth holders from Border City Tool and Manufacturing Company of Warren, Mich.

Figure 7:
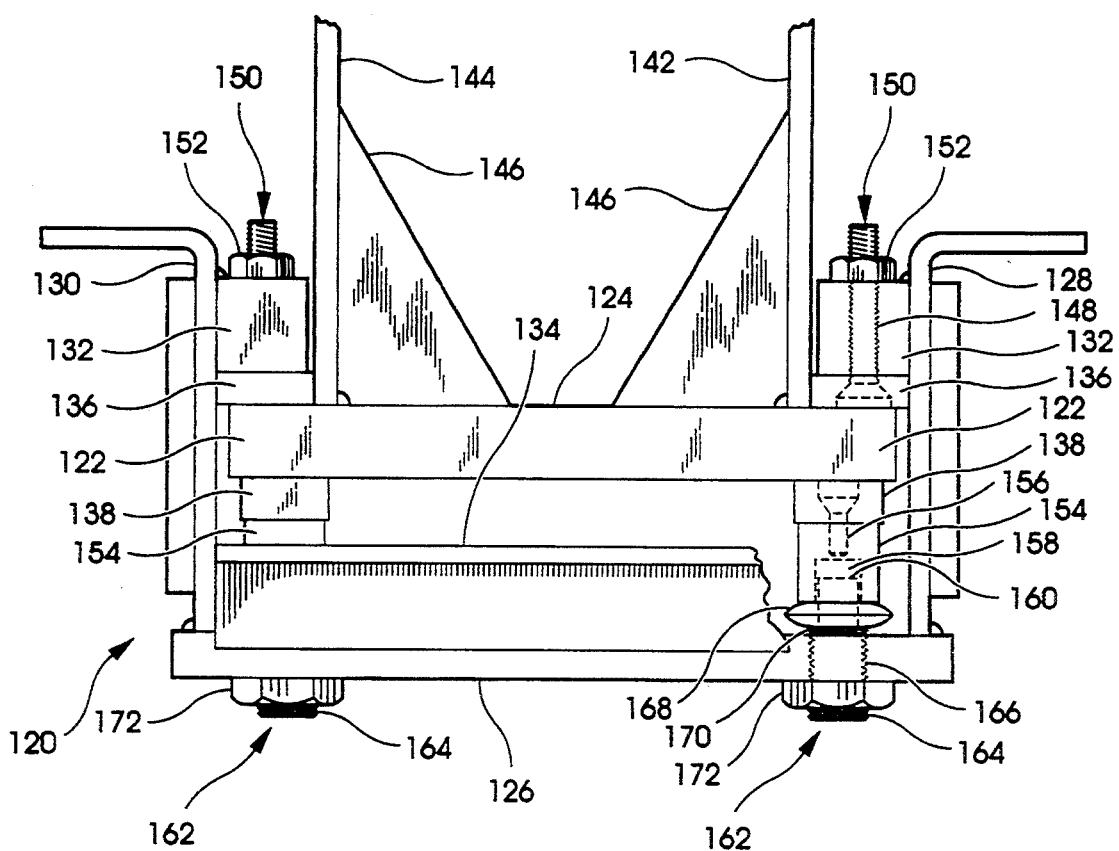
FIG. 7 s a front end view of the slide carriage and carriage mounting plate on the telescopic extension of the stump grinder of FIG. 1.

Turning now to FIGS. 6 and 7, the telescopic extension includes a slider carriage 120 which is slidably mounted on opposite lateral ends 122 of an elongated flat plate 124 which is supported in a horizontal plane by left and right side gussets 142 and 144 welded to main beam 14 and to carriage mounting plate 124. Reinforcement is provided by corner brackets 146. A suitable material for the carriage mounting plate is 1"×8" cold rolled steel. The slider carriage includes a pair of horizontal bottom plates 126 welded to the bottom of left and right side walls or plates 128 and 130, a slide rail 132 welded to and extending horizontally along the inside surface of each side plate, and two support braces 134 on each bottom plate. Each brace is formed of angle iron and is welded between the side walls and its associated bottom plate.

The slider carriage utilizes an upper set of elongated slider blocks 136 and a lower set of elongated slider blocks 138 in a zero-lash configuration, i.e., with zero clearance between them and the carriage mounting plate, the upper set being secured as stationary blocks and the lower set being mounted as floating blocks in the preferred embodiment. The floating blocks 138 are spring-loaded to maintain zero lash in the presence of taper and other irregularities in metal surfaces, particularly the mounting plate, and also wear on the slider blocks. A suitable material for the slider blocks is ultra high molecular weight (UHMW) polyethylene. The blocks are preferably 4" long as viewed in FIG. 6, as are the bottom plates. One-half inch is a suitable block height, and the block width is selected such that the stationary blocks fit snugly between the associated gussets and side plates, leaving a desired amount of clearance between the bare metal surfaces of the side plate and the lateral edges of carriage mounting plate 124, and also between the gussets and slide rails.

The carriage slide rails 132 are provided with through holes 148 and the stationary blocks are secured thereto by countersunk screws 150 and lock nuts 152. Each floating block is screwed onto an elongated base 154, also preferably 4" long, which is provided with a pair of threaded holes 156 in its top surface for this purpose. The bottom of the base is counterbored as at 158 to engage the unthreaded ends 160 of a pair of dogpoint set screws 162; the threaded end 164 of each dogpoint screw is screwed into one of the carriage bottom plates, which are provided with threaded holes 166 for this purpose. Bellville washers 168 are stacked on the unthreaded end of each dogpoint screw between the shoulder 170 of the screw and the floating base, as shown in FIG. 7, thus enabling the floating blocks to be upwardly spring-biased toward the bottom of the carriage mounting plate by adjustment of the dogpoint screws. Preferably there are four Bellville washers in each stack, although a stack of two as illustrated may be found adequate. The dogpoint screws are secured in position by lock nuts 172. The floating bases are counterbored on the bottom sufficiently to allow for compression of the Bellville spring stack and for corresponding clearance within the floating base for the upper end of the adjustment screw 162, which is preferably tightened sufficiently to produce 4000 pounds of compression per stack. The slider blocks are countersunk as shown in FIG. 7 to allow for a desired amount of acceptable wear on their surfaces contacting the carriage mounting plate before replacement of the slider blocks. The carriage mounting configuration including the UHMW blocks and Bellville spring stack as just described automatically compensates for wear on the slider blocks and thereby maintains low-friction, zero-lash operation.

Although the principles of the present invention are considered applicable to stand-alone and towable stump grinders, the preferred embodiment of the stump grinder according to the present invention is particularly suited for attachment to a tractor having a conventional three-point hitch and nominal 540 rpm PTO drive. Returning to FIGS. 1 and 2, a central upper mounting bracket 102 and left and right side lower mounting brackets 104 and 106 extend forward from main support frame 16 of the stump grinder, each preferably with multiple mounting holes therein, for attachment to the upper and lower links 108, 110 and 112 of a three-point hitch. The links of the three-point hitch are pivotally mounted on the tractor transaxle 114 as shown in FIG. 2, and are raised by action of control arms 116, which are pulled upward and forward hydraulically.

During operation the drive line is frequently at an angle, both vertically and horizontally, with respect to the longitudinal axis of the PTO output shaft and with respect to the axis about which the cutter wheel rotates. As a result, with conventional universal joints as preferably employed with the stump grinder, the drive line experiences fluctuations in angular velocity relative to the PTO output shaft, even with the PTO output shaft rotating at constant speed, and, likewise, the cutter wheel experiences fluctuations in angular velocity relative to the drive line. The stump grinder according to a further aspect of the present invention is designed to compensate for such angular velocity differences.

More specifically, multiple universal joints are utilized in conjunction with other aspects of the stump grinder geometry to obtain angles between the drive line and the cutter wheel axis which match or nearly match the corresponding angles between the drive line and the PTO output shaft axis, in both the vertical and horizontal planes. Nonzero angles appear in the vertical plane whenever the wheel axis and the PTO shaft axis are at different levels, as is routine during normal operation at different cutting depths. The support frame is adapted to be mounted perpendicular to the PTO shaft axis, which is assumed to be horizontal for reference purposes, whereby the PTO shaft axis and the wheel axis lie in parallel horizontal planes and thus the drive line is at the same vertical angle with respect to each. This angular relationship produces offsetting angular velocity differences and thus theoretically eliminates angular velocity differences between the PTO shaft and the cutter wheel due to difference in height.

It is also desirable to eliminate or minimize such angular velocity differences due to operation with the drive line at an angle to the PTO shaft axis in the horizontal plane, as occurs when the main beam is swung laterally. For this purpose, the longitudinal dimensions of the stump grinder, and particularly the length of the main beam, are set such that the pivot point 118 on the support frame is approximately equidistant from the two universal joints in the drive line when the stump grinder is mounted on the three-point hitch, preferably with the telescopic extension in the middle of its range. As a result, when the main beam is swung left or right, the angle between the PTO shaft and the vertical plane through the drive line remains approximately equal to the corresponding angle between that plane and the wheel axis, with the PTO shaft and spindle lying on the same side of the drive line in this situation. This angular relationship minimizes angular velocity differences between the PTO shaft and the cutter wheel due to pivoting of the main beam.

In setting up the stump grinder, first an appropriate hole within lower hitch mounting brackets 104 and 106 is selected so as to obtain proper horizontal spacing between pivot point 118 and front universal joint 80. Then an appropriate hole within upper mounting bracket 102 is selected along with an appropriate length of top link 108, which is adjustable in length, such that the support frame is vertically oriented and remains substantially so as the hitch is raised and lowered.

Another aspect of the present invention is an automatically retractable chip screen. Referring to FIG. 1, chip screen 180 is supported on the lower leg 182 of the left stabilizer by a frame comprising vertical bracket 184 attached to the upper end of lower leg 182, horizontal top bracket 186, and angled bracket 188 attached to the pad 190 of the left stabilizer so as to retain the central portion of the chip screen in a vertical plane parallel to the longitudinal axis of the tractor. The chip screen includes an angled panel on either side of the central portion, with the panels and central portion adapted for ground contact along with pad 190 although the screen is shown partially cut away for illustration of the stabilizer structure.

As shown in FIG. 1, the stump grinder is also preferably provided with a shield 194 which is preferably clear polycarbonate to protect the operator from any flying debris which might travel in his direction while allowing him to maintain visual contact with the cutting operation. Also, a retractable stand 196 is provided on the lower end of each vertical frame member to support the stump grinder if desired when detached from a tractor. The stands are slidably mounted within the vertical frame members and are held in upper or lower positions by cross pins (not shown) placed through holes provided in the frame members for this purpose.

In operation, the stump grinder attached to a three-point hitch of a tractor is maneuvered into position by moving the tractor with the hitch in its uppermost position, whereby the stump grinder is raised well above ground level. With the cutter wheel positioned to the right of the stump, as viewed from the rear, the hitch links are partially lowered and then the stabilizers are lowered to the ground. The depth control of the hitch is then adjusted for maximum depth, thereby removing all tension from control arms 116 and allowing the hitch links to pivot freely on the link points on the tractor. This enables the stabilizers to provide depth control for cutting. The stabilizers are adjusted for a desired first cutting depth and the main beam is then swung such that the cutter wheel moves from right to left across a portion of the stump. The cutter wheel is returned to the right side after completing a first pass across the stump, the stump grinder is lowered with the stabilizers, and another pass is performed. After several passes, the telescopic extension is moved to reposition the cutter wheel longitudinally with respect to the stump, and the cutting operation is repeated at that position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A stump grinder, comprising:
   a support frame;
   a plurality of stabilizers mounted on said frame;
   an elongated main beam horizontally pivotally mounted on said frame, said main beam movable horizontally with respect to said stabilizers;
   a cutter wheel supported by and transversely oriented with respect to said main beam, said cutter wheel having a plurality of peripherally mounted stump cutter teeth.

2. The stump grinder of claim 1, wherein said frame includes means for supporting said stump grinder on a hitch of a tractor having a power take-off,
   and further comprising a drive line adapted to interconnect said cutter wheel and the tractor power take-off.

3. The stump grinder of claim 2, further comprising:
   a vertical support member connected to one end of said main beam;
   a spindle mounted horizontally in said vertical support member;
   hub rotatably mounted on said spindle;
   wherein said cutter wheel is removably mounted on said hub.

4. The stump grinder of claim 3, wherein said drive line includes a drive shaft with a universal joint on each end, and a slip clutch connected to one of said universal joints, said drive line connected on one end to said cutter wheel and including means on the opposite end for connecting to the tractor power take-off.

5. The stump grinder of claim 4, wherein the pivot point on said frame is approximately equidistant from said universal joints when said stump grinder is mounted on the tractor hitch, thereby minimizing angular velocity differences between the tractor power take-off and said cutter wheel during transverse movement of said main beam and cutter wheel.

6. The stump grinder of claim 5, further comprising means peripherally mounted on said cutter wheel for limiting the depth of cut of an individual stump cutter tooth to less than approximately one-half inch during upcutting.

7. The stump grinder of claim 6, further comprising a telescopic extension slidably mounted on said main beam, said telescopic extension having a defined extension range, said vertical support member mounted on said telescopic extension,
   wherein the pivot point on said frame is approximately equidistant from said cutter wheel and the tractor power take-off when said stump grinder is mounted on the tractor hitch with said telescopic extension in the center of said extension range.

8. The stump grinder of claim 7, wherein said stabilizers are retractable,
   and further comprising means for adjusting said stabilizers within a defined operating range for control of the cutting depth of said cutter wheel.

9. The stump grinder of claim 8, further comprising a chip screen mounted on one stabilizer and extendable therewith to a ground position in which said chip screen is in the discharge path of said cutter wheel.

10. The stump grinder of claim 1, further comprising:
    drive line means for driving said cutter wheel from the power take-off of a tractor, said drive line means including compensating means including multiple universal joints for minimizing angular velocity differences between the tractor power take-off and said cutter wheel during movement of said main beam and cutter wheel.

11. The stump grinder of claim 1, further comprising means peripherally mounted on said cutter wheel for limiting the depth of cut of an individual stump cutter tooth to less than approximately one-half inch during upcutting.

12. The stump grinder of claim 11, wherein said depth gauge means includes a plurality of tooth holders each having an axially extending flat surface, and wherein each cutter tooth includes an elongated base portion which is held between its respective booth holder and the periphery of said cutter wheel, and a cutting surface which extends radially outwardly from said flat surface approximately one-quarter inch.

13. The stump grinder of claim 12, wherein said cutter wheel includes a generally circular plate having front and rear faces and peripheral mounting surface means extending axially beyond said front and rear faces for mounting said tooth holders.

14. The stump grinder of claim 1, further comprising a telescopic extension slidably mounted on said main beam, said telescopic extension including a slider carriage and a plurality of zero-lash, wear-compensated slider blocks interconnecting said slider carriage and said main beam.

15. A stump grinder, comprising:
    a support frame;
    an elongated main beam horizontally pivotally mounted on said frame;
    a cutter wheel supported by and transversely oriented with respect to said main beam, said cutter wheel having a plurality of peripherally mounted stump cutter teeth and noncutting front and rear faces.

16. The stump grinder of claim 15, further comprising:

drive line means for driving said cutter wheel from the power take-off of a tractor, said drive line means including compensating means including multiple universal joints for minimizing angular velocity differences between the tractor power take-off and said cutter wheel during movement of said main beam and cutter wheel.

17. The stump grinder of claim 16, further comprising means peripherally mounted on said cutter wheel for limiting the depth of cut of an individual stump cutter tooth to less than approximately one-half inch during upcutting.

18. The stump grinder of claim 17, further comprising a telescopic extension slidably mounted on said main beam, said telescopic extension including a slider carriage and a plurality of zero-lash, wear-compensated slider blocks interconnecting said slider carriage and said main beam.

19. A stump grinder, comprising:

a support frame;

an elongated main beam horizontally pivotally mounted on said frame;

a cutter wheel supported by and transversely oriented with respect to said main beam and rotatable about a substantially horizontal axis, said cutter wheel having a plurality of peripherally mounted stump cutter teeth spaced apart circumferentially and axially in a predetermined transversely oriented cutting pattern.

20. The stump grinder of claim 19, wherein said frame includes means for supporting said stump grinder on a hitch of a tractor having a power take-off, and further comprising a drive line adapted to interconnect said cutter wheel and the tractor power take-off.

21. The stump grinder of claim 20, further comprising:

a vertical support member connected to one end of said main beam;

a spindle mounted horizontally in said vertical support member;

a hub rotatably mounted on said spindle;

wherein said cutter wheel is removably mounted on said hub.

22. The stump grinder of claim 21, wherein said drive line includes a drive shaft with a universal joint on each end, and a slip clutch connected to one of said universal joints, said drive line connected on one end to said cutter wheel and including means on the opposite end for connecting to the tractor power take-off.

23. The stump grinder of claim 22, wherein the pivot point on said frame is approximately equidistant from said universal joints when said stump grinder is mounted on the tractor hitch, thereby minimizing angular velocity differences between the tractor power take-off and said cutter wheel during transverse movement of said main beam and cutter wheel.

24. The stump grinder of claim 23, further comprising means peripherally mounted on said cutter wheel for limiting the depth of cut of an individual stump cutter tooth to less than approximately one-half inch during upcutting.

25. The stump grinder of claim 24, further comprising a telescopic extension slidably mounted on said main beam, said telescopic extension having a defined extension range, said vertical support member mounted on said telescopic extension, wherein the pivot point on said frame is approximately equidistant from said cutter wheel and the tractor power take-off when said stump grinder is mounted on the tractor hitch with said telescopic extension in the center of said extension range.

26. The stump grinder of claim 25, wherein said stabilizers are retractable, and further comprising means for adjusting said stabilizers within a defined operating range for control of the cutting depth of said cutter wheel.

27. The stump grinder of claim 26, further comprising a chip screen mounted on one stabilizer and extendable therewith to a ground position in which said chip screen is in the discharge path of said cutter wheel.

28. The stump grinder of claim 19, further comprising:

drive line means for driving said cutter wheel from the power take-off of a tractor, said drive line means including compensating means including multiple universal joints for minimizing angular velocity differences between the tractor power take-off and said cutter wheel during movement of said main beam and cutter wheel.

29. The stump grinder of claim 19, further comprising means peripherally mounted on said cutter wheel for limiting the depth of cut of an individual stump cutter tooth to less than approximately one-half inch during upcutting.

30. The stump grinder of claim 29, wherein said depth gauge means includes a plurality of tooth holders each having an axially extending flat surface, and wherein each cutter tooth includes an elongated base portion which is held between its respective tooth holder and the periphery of said cutter wheel, and a cutting surface which extends radially outwardly from said flat surface approximately one-quarter inch.

31. The stump grinder of claim 30, wherein said cutter wheel includes a generally circular plate having front and rear faces and peripheral mounting surface means extending axially beyond said front and rear faces for mounting said tooth holders.

32. The stump grinder of claim 19, further comprising a telescopic extension slidably mounted on said main beam, said telescopic extension including a slider carriage and a plurality of zero-lash, wear-compensated slider blocks interconnecting said slider carriage and said main beam.

33. A method of grinding a stump, comprising the steps:

providing a cutter wheel with a plurality of peripherally mounted stump cutter teeth;

supporting said cutter wheel with an elongated main beam pivotally mounted for movement in a horizontal plane, with said cutter wheel transversely oriented with respect to said main beam, said main beam and cutter wheel together defining a transversely oriented cutting path;

positioning said main beam in operative proximity to a stump with said cutter wheel adjacent to one side of said stump and with said stump lying in said transversely oriented cutting path moving said main beam and cutter wheel transversely to grind a portion of said stump.

34. The method of claim 33, further comprising the steps:

driving said cutter wheel from the power take-off of a tractor; and compensating with multiple universal joints for angular velocity differences between the tractor power take-off and said cutter wheel during movement of said main beam and cutter wheel.

35. The stump grinder of claim 33, further comprising the step of limiting the depth of cut of an individual stump cutter tooth to less than approximately one-half inch during upcutting.

36. The stump grinder of claim 33, further comprising the step of telescopically extending said main beam with a slider carriage and a plurality of zero-lash, wear-compensated slider blocks interconnecting said slider carriage and said main beam.

* * * * *